US011928683B2

(12) United States Patent
Laptiev et al.

(10) Patent No.: US 11,928,683 B2
(45) Date of Patent: Mar. 12, 2024

(54) FEATURE ENCODING IN ONLINE APPLICATION ORIGINATION (OAO) SERVICE FOR A FRAUD PREVENTION SYSTEM

(71) Applicant: MASTERCARD TECHNOLOGIES CANADA ULC, Vancouver (CA)

(72) Inventors: Anton Laptiev, Vancouver (CA); Parin Prashant Shah, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 17/060,866

(22) Filed: Oct. 1, 2020

(65) Prior Publication Data

US 2021/0097545 A1 Apr. 1, 2021

Related U.S. Application Data

(60) Provisional application No. 62/909,035, filed on Oct. 1, 2019.

(51) Int. Cl.
*G06Q 20/40* (2012.01)
*G06F 17/16* (2006.01)
(Continued)

(52) U.S. Cl.
CPC ......... *G06Q 20/4016* (2013.01); *G06F 17/16* (2013.01); *G06N 20/00* (2019.01)

(58) Field of Classification Search
None
See application file for complete search history.

(56) References Cited

U.S. PATENT DOCUMENTS 7,458,508 B1 12/2008 Shao et al.
8,953,729 B1 * 2/2015 Hartless ................ H04L 7/0029
375/355
(Continued)

OTHER PUBLICATIONS

International Search Report and Written Opinion for Application No. PCT/CA2020/050268 dated May 26, 2020 (7 pages).
(Continued)

*Primary Examiner* — Arunava Chakravarti
*Assistant Examiner* — Bhavin D Shah
(74) *Attorney, Agent, or Firm* — Michael Best & Friedrich LLP (57) ABSTRACT

A fraud prevention server and method. The fraud prevention server includes an electronic processor and a memory. The memory includes an online application origination (OAO) service. The electronic processor is configured to perform feature encoding on one or more categorical variables in a first matrix to generate one or more feature encoded categorical variables, generate a second matrix including the one or more feature encoded categorical variables, generate a feature encoded OAO model by training an OAO model with the second matrix, receive information regarding a submission of an online application on a device, determine a fraud score of the online application based on the information that is received and the feature encoded OAO model, the feature encoded OAO model being more precise than the OAO model, and control the client server to approve, hold, or deny the online application based on the fraud score that is determined.

21 Claims, 5 Drawing Sheets

(51) Int. Cl.
*G06N 20/00* (2019.01)
*H04L 9/40* (2022.01)

(56) References Cited

U.S. PATENT DOCUMENTS

| | | | |
|---|---|---|---|
| 9,646,322 B2 | 5/2017 | Minnis et al. | |
| 10,282,728 B2 | 5/2019 | Avegliano et al. | |
| 10,290,053 B2 | 5/2019 | Priess et al. | |
| 10,382,466 B2 | 8/2019 | Ostergaard | |
| 10,410,140 B1* | 9/2019 | Nair | G06N 5/02 |
| 10,574,683 B1 | 2/2020 | Ghosh et al. | |
| 10,832,248 B1* | 11/2020 | Kramme | G06Q 20/34 |
| 10,846,434 B1 | 11/2020 | Ben-Zvi et al. | |
| 10,867,303 B1 | 12/2020 | Manapat et al. | |
| 11,012,454 B1 | 5/2021 | Han et al. | |
| 11,025,638 B2 | 6/2021 | Ford et al. | |
| 11,151,468 B1 | 10/2021 | Chen et al. | |
| 11,200,324 B1 | 12/2021 | Manral | |
| 11,250,435 B2 | 2/2022 | Turgeman et al. | |
| 11,250,444 B2 | 2/2022 | Yao et al. | |
| 2002/0099649 A1 | 7/2002 | Lee et al. | |
| 2003/0069857 A1 | 4/2003 | Junda | |
| 2004/0153663 A1 | 8/2004 | Clark et al. | |
| 2004/0221171 A1 | 11/2004 | Ahmed et al. | |
| 2005/0039036 A1 | 2/2005 | Eisen | |
| 2005/0154676 A1 | 7/2005 | Ronning et al. | |
| 2006/0149580 A1 | 7/2006 | Helsper et al. | |
| 2006/0161403 A1 | 7/2006 | Jiang et al. | |
| 2006/0271457 A1 | 11/2006 | Romain et al. | |
| 2007/0112667 A1 | 5/2007 | Rucker | |
| 2007/0239604 A1 | 10/2007 | O'Connell et al. | |
| 2007/0244808 A1 | 10/2007 | Eze | |
| 2007/0261112 A1 | 11/2007 | Todd et al. | |
| 2008/0086759 A1 | 4/2008 | Colson | |
| 2009/0089869 A1 | 4/2009 | Varghese | |
| 2009/0099959 A1 | 4/2009 | Iao et al. | |
| 2009/0248600 A1 | 10/2009 | Kennel | |
| 2010/0036672 A1 | 2/2010 | Li et al. | |
| 2010/0094767 A1 | 4/2010 | Miltonberger | |
| 2010/0094768 A1 | 4/2010 | Miltonberger | |
| 2010/0293090 A1 | 11/2010 | Domenikos et al. | |
| 2010/0293094 A1* | 11/2010 | Kolkowitz | G06Q 20/40 705/44 |
| 2011/0251823 A1 | 10/2011 | Davis et al. | |
| 2011/0276468 A1 | 11/2011 | Lewis et al. | |
| 2013/0097709 A1 | 4/2013 | Basavapatna et al. | |
| 2013/0110692 A1 | 5/2013 | Nightengale et al. | |
| 2014/0289867 A1 | 9/2014 | Bukai | |
| 2014/0304814 A1 | 10/2014 | Ott et al. | |
| 2015/0046332 A1 | 2/2015 | Adjaoute | |
| 2015/0205957 A1 | 7/2015 | Turgeman et al. | |
| 2015/0206214 A1 | 7/2015 | Adjaoute | |
| 2015/0324908 A1 | 11/2015 | Starikova et al. | |
| 2016/0005044 A1 | 1/2016 | Moss et al. | |
| 2016/0071025 A1 | 3/2016 | Brand et al. | |
| 2016/0143570 A1 | 5/2016 | Valacich et al. | |
| 2016/0226901 A1 | 8/2016 | Baiklov et al. | |
| 2016/0232353 A1 | 8/2016 | Gupta et al. | |
| 2016/0328572 A1 | 11/2016 | Valacich et al. | |
| 2017/0032463 A1 | 2/2017 | Hunter et al. | |
| 2017/0070521 A1 | 3/2017 | Bailey et al. | |
| 2017/0134412 A1 | 5/2017 | Cheng et al. | |
| 2017/0161747 A1 | 6/2017 | Einhorn et al. | |
| 2017/0213280 A1* | 7/2017 | Kaznady | G06N 20/00 |
| 2017/0221055 A1 | 8/2017 | Carlsson et al. | |
| 2017/0286671 A1 | 10/2017 | Chari et al. | |
| 2018/0160309 A1 | 6/2018 | Turgeman et al. | |
| 2018/0191745 A1 | 7/2018 | Moradi et al. | |
| 2018/0191762 A1* | 7/2018 | Bailey | G06F 21/602 |
| 2019/0026754 A1 | 1/2019 | Miltonberger | |
| 2019/0158535 A1 | 5/2019 | Kedem et al. | |
| 2019/0205885 A1* | 7/2019 | Lim | G06Q 20/4016 |
| 2019/0253431 A1 | 8/2019 | Atanda | |
| 2019/0311367 A1 | 10/2019 | Reddy et al. | |
| 2019/0378397 A1* | 12/2019 | Williams, II | G06N 5/046 |
| 2020/0097662 A1 | 3/2020 | Hufsmith et al. | |
| 2020/0279284 A1 | 9/2020 | Garg et al. | |

OTHER PUBLICATIONS

International Search Report and Written Opinion for Application No. PCT/CA2020/050269 dated Apr. 29, 2020 (11 pages).
International Search Report and Written Opinion for Application No. PCT/CA2020/050270 dated May 22, 2020 (12 pages).
International Search Report and Written Opinion for Application No. PCT/CA2020/051315 dated Dec. 30, 2020 (12 pages).
Wang et al., "The Visual Causality Analyst: An Interactive Interface for Causal Reasoning," IEEE Transactions on Visualization and Computer Graphics, 2016, 22(1): 230-239.
European Patent Office Extended Search Report for Application No. 20872136.5 dated Sep. 18, 2023 (12 pages).

* cited by examiner

FEATURE ENCODING IN ONLINE APPLICATION ORIGINATION (OAO) SERVICE FOR A FRAUD PREVENTION SYSTEM

CROSS-REFERENCE TO RELATED APPLICATION

This application claims priority to and the benefit of U.S. Provisional Application No. 62/909,035, filed on Oct. 1, 2019, the entire contents of which is incorporated herein by reference.

FIELD OF INVENTION

The present disclosure generally relates to fraud detection. More specifically, the present disclosure relates to feature encoding in an online application origination (OAO) service for a fraud prevention system.

BACKGROUND

Preventing identity fraud is a major area of attention for merchants and financial institutions. It is estimated there were more than sixteen million victims of identity fraud in 2017, with $16.8 billion in losses attributed to identity theft alone. Credit card fraud was also the most reported form of identity theft with over one hundred and thirty thousand reports in 2017. More concerning, it is estimated that more than fifty-eight million records have been exposed between January and November of 2018.

Identity theft is typically difficult to prevent for two main reasons. First, conventional detection methods tend to fail because those methods are based on analysis of personally identifiable information (also referred to as "PII") (which may be stolen) or analysis of traffic properties (which may be obscured or faked). Second, conventional detection methods do not prevent loss because the conventional methods look only or primarily at the data being entered. In general, the conventional detection methods are reactive because the conventional detection methods require analysis after-the-fact to detect fraud and do not prevent fraud losses.

SUMMARY

Embodiments described herein relate to an online application origination service (also referred to as "OAO service") for fraud prevention systems. The OAO service analyzes a user's behavior at the point of online application submission, providing real-time risk assessment and detecting high-risk application attempts, while enabling friction-free processing of low-risk applications. Behavioral biometrics provide a more reliable means of loss prevention by analyzing reliable behavior signals and detecting fraud at application-time, prior to possible losses. The OAO service provides fraud prevention and good user verification at the point of online application origination, providing case-specific risk assessment and escalation of fraudulent application attempts.

One advantage to the OAO service over conventional methods is a higher capture rate of nefarious actors by utilizing behavioral analysis. Another advantage is more efficient use of computer resources by a client server. For example, the higher capture rate by the fraud prevention server results in more fraudulent on-line applications being denied at the client server, which allows the client server to more efficiently and effectively focus its resources on other tasks. Additionally, the feature encoding as described herein further increases efficiency with respect to the use of computer resources by the client server because the OAO model trained with a feature encoded matrix is more precise in differentiating between behavior of a nefarious actor and behavior of a normal user than an OAO model that is not trained with a feature encoded matrix.

One embodiment described herein is a fraud prevention system that includes a client server and a fraud prevention server. The fraud prevention server includes an electronic processor and a memory. The memory includes an online application origination (OAO) service. The electronic processor, when executing the OAO service, is configured to receive a training dataset of fraudulent applications, and generate, with machine learning, an online application origination (OAO) model of the OAO service based on the training dataset, the OAO model differentiating between a behavior of a normal user and a fraudulent behavior of a nefarious actor during a submission of an online application on a device. The electronic processor, when executing the OAO service, is configured to perform feature encoding on one or more categorical variables in a first matrix to generate one or more feature encoded categorical variables, the first matrix including the one or more categorical variables and numerical features, and the one or more feature encoded categorical variables are feature encoded with one or more numerical values of the numerical features, generate a second matrix including the one or more feature encoded categorical variables, and generate a feature encoded OAO model by training the OAO model with the second matrix. The electronic processor, when executing the OAO service, is also configured to receive information regarding the submission of the online application on the device, determine a fraud score of the online application based on the information that is received and the feature encoded OAO model, the feature encoded OAO model being more precise than the OAO model, and control the client server to approve, hold, or deny the online application based on the fraud score that is determined.

Another embodiment described herein is a method for operating a fraud prevention system. The method includes receiving, with an electronic processor, a training dataset of fraudulent applications. The method includes generating, with the electronic processor and machine learning, an online application origination (OAO) model of the OAO service based on the training dataset, the OAO model differentiating between a behavior of a normal user and a fraudulent behavior of a nefarious actor during a submission of an online application on a device. The method includes performing, with the electronic processor, feature encoding on one or more categorical variables in a first matrix to generate one or more feature encoded categorical variables, the first matrix including the one or more categorical variables and numerical features, and the one or more feature encoded categorical variables are feature encoded with one or more numerical values of the numerical features. The method includes generating, with the electronic processor, a second matrix including the one or more feature encoded categorical variables. The method includes generating, with the electronic processor, a feature encoded OAO model by training the OAO model with the second matrix. The method includes receiving, with the electronic processor, information regarding the submission of the online application on the device. The method includes determining, with the electronic processor, a fraud score of the online application based on the information that is received and the feature encoded OAO model, the feature encoded OAO model being more precise than the OAO model. The method also includes controlling, with the electronic processor, a server to approve, hold, or deny the online application based on the fraud score that is determined.

Yet another embodiment described herein is a non-transitory computer-readable medium comprising instructions that, when executed by an electronic processor, causes the electronic processor to perform a set of operations. The set of operations includes receiving a training dataset of fraudulent applications. The set of operations includes generating, with machine learning, an online application origination (OAO) model of the OAO service based on the training dataset, the OAO model differentiating between a behavior of a normal user and a fraudulent behavior of a nefarious actor during a submission of an online application on a device. The set of operations includes performing feature encoding on one or more categorical variables in a first matrix to generate one or more feature encoded categorical variables, the first matrix including the one or more categorical variables and numerical features, and the one or more feature encoded categorical variables are feature encoded with one or more numerical values of the numerical features. The set of operations includes generating a second matrix including the one or more feature encoded categorical variables. The set of operations includes generating a feature encoded OAO model by training the OAO model with the second matrix. The set of operations includes receiving information regarding the submission of the online application on the device. The set of operations includes determining a fraud score of the online application based on the information that is received and the feature encoded OAO model, the feature encoded OAO model being more precise than the OAO model. The set of operations also includes controlling a server to approve, hold, or deny the online application based on the fraud score that is determined.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more electronic processors, one or more computer-readable medium modules, one or more input/output interfaces, and various connections (e.g., a system bus) connecting the various components.

Other aspects of the embodiments will become apparent by consideration of the detailed description and accompanying drawings.

DETAILED DESCRIPTION

Embodiments described herein relate to an online application origination service (also referred to as "OAO service") for a fraud prevention system, and environments and systems utilizing this service. The OAO service analyzes form completion behavior, evaluating hundreds of non-identifying and zero-permission attributes against each application. These attributes capture a variety of distinctive behavioral markers that are predictive of application fraud risk.

Nefarious actors tend to display a familiarity with, e.g., form content and technological fluency that allows them to complete forms quickly, surely and by leveraging technological tricks and shortcuts. The OAO service monitors dozens of attributes related to typing speed and cadence, fluency of field navigation, shortcut use and form familiarity (expressed through such behaviors as skipping optional fields and avoiding form completion errors). The OAO service evaluates a range of directness, exploratory and detail-checking behaviors that differ significantly between good and nefarious actors.

Figure 1:
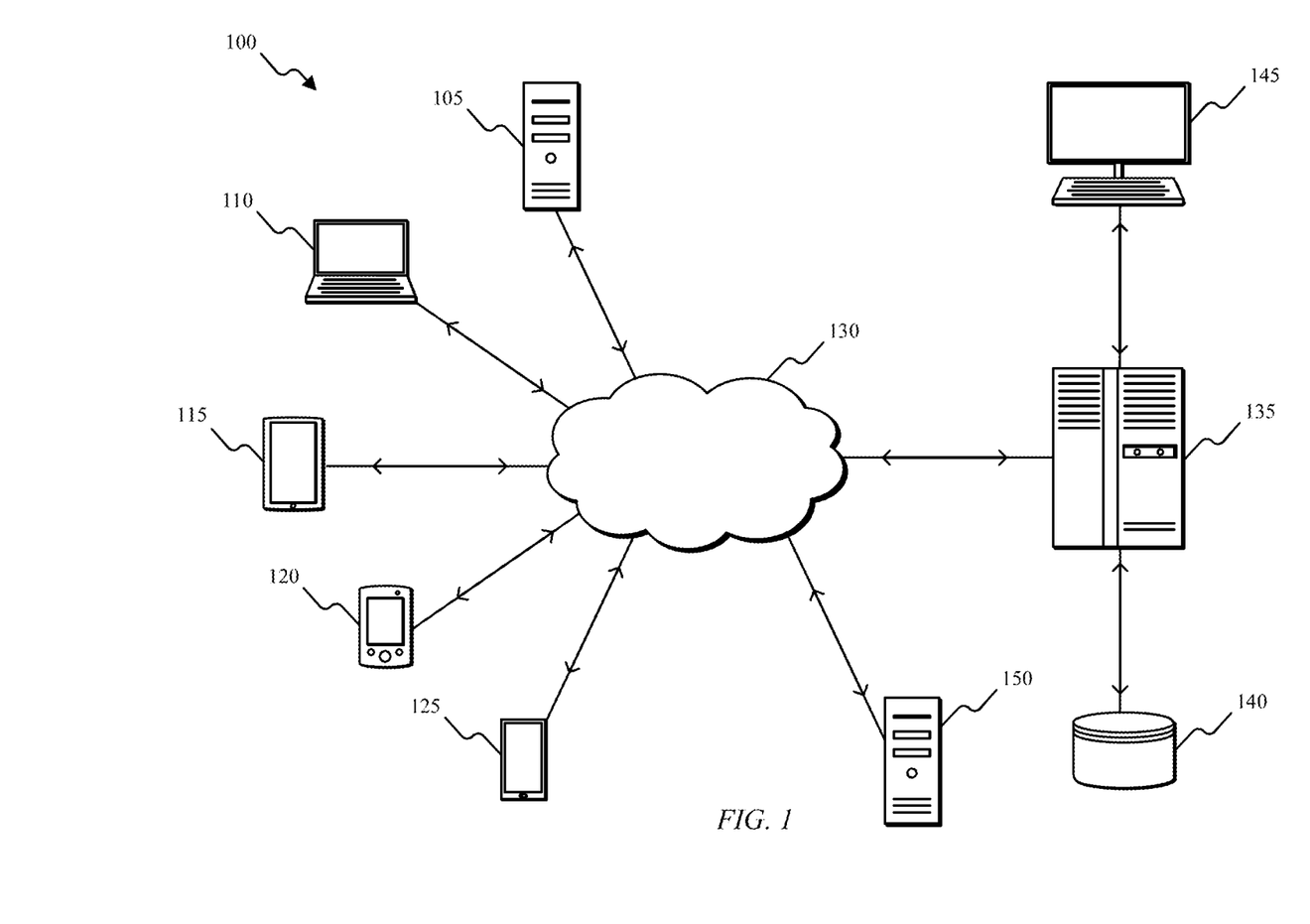
FIG. 1 is a diagram that illustrates a fraud prevention system 100 for an OAO service that evaluates a user's behavior while opening an online account, according to embodiments described herein.

FIG. 1 illustrates a fraud prevention system 100 for an OAO service that evaluates a user's behavior while opening an online account. The system 100 includes a plurality of user devices 105-125, a network 130, a fraud prevention server 135, a database 140, a server-side user interface 145 (e.g., a workstation), and a client server 150. The plurality of user devices 105-125 include, for example, a personal, desktop computer 105, a laptop computer 110, a tablet computer 115, a personal digital assistant ("PDA") (e.g., an iPod touch, an e-reader, etc.) 120, and a mobile phone (e.g., a smart phone) 125. Each of the user devices 105-125 is configured to communicatively connect to the fraud prevention server 135 through the network 130 and provide information to the fraud prevention server 135 related to attributes or values for attributes of the user devices 105-125. Attributes of the user devices 105-125 include, for example, user agent, operating system, account ID, location, time of day, mouse location, or other suitable attribute information regarding both the user device and a user of the user device.

Attribute information received from the user devices 105-125 at the fraud prevention server 135 may be stored in the database 140.

The network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 130 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a Digital Enhanced Cordless Telecommunications ("DECT") network, a Digital AMPS ("IS-136/TDMA") network, or an Integrated Digital Enhanced Network ("iDEN") network, etc.

The connections between the user devices 105-125 and the network 130 are, for example, wired connections, wireless connections, or a combination of wireless and wired connections. The connection between the fraud prevention server 135 and the network 130 is a wired connection, wireless connection, or a combination of wireless and wired connections. The connection between the client server 150 and the network 130 is a wired connection, wireless connection, or a combination of wireless and wired connections.

The client server 150 is a server of a resource provider. For example, the client server 150 is a bank server that provides a credit card to a user that establishes an account with the bank by performing an online application origination (e.g., filling out a form, either as part or all of what is required to establish an account). The remainder of the disclosure refers to a "credit card" as the resource that is provided by the resource provider. However, any resource that is available by an online application origination may be considered in place of the "credit card" as described herein.

Figure 2:
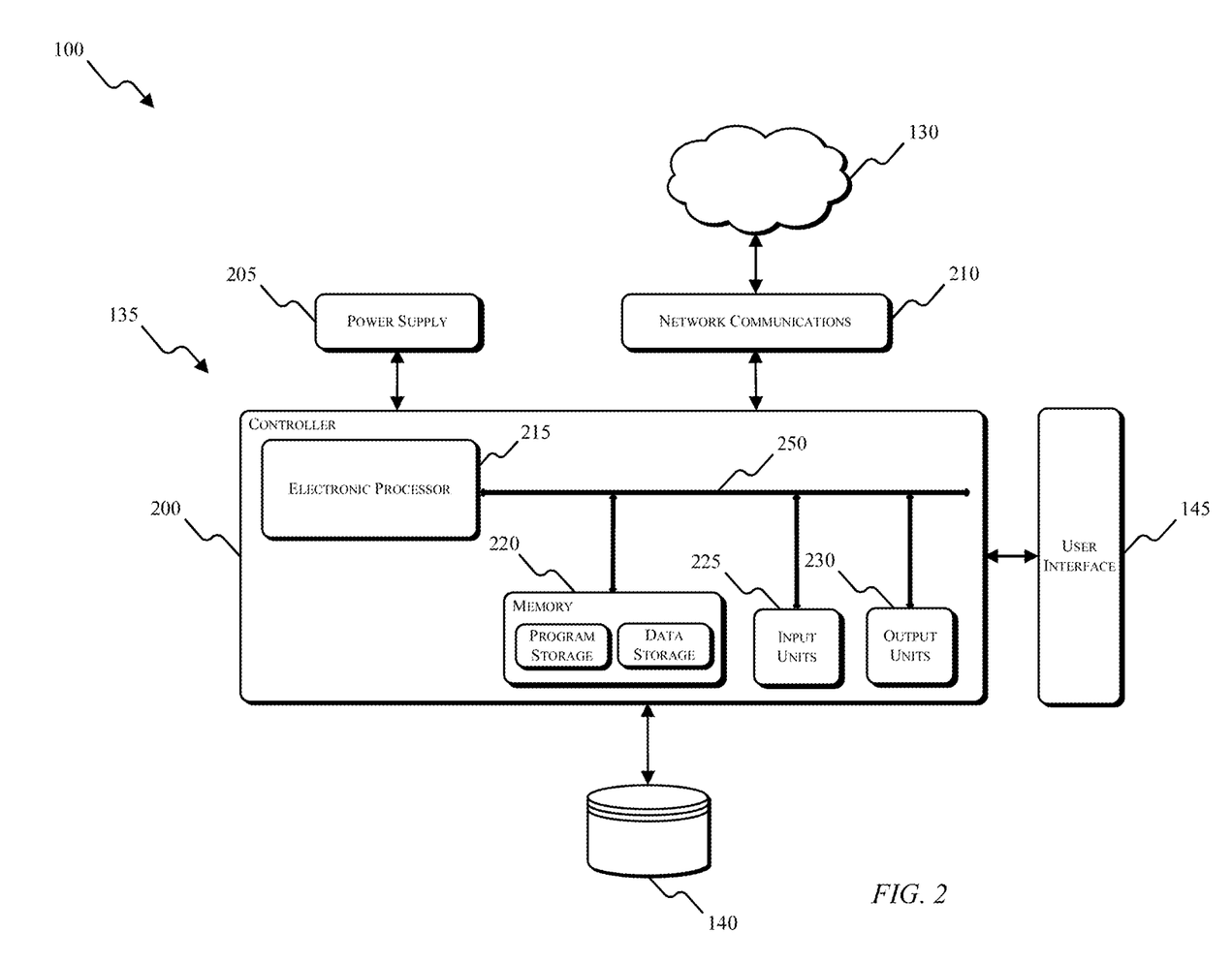
FIG. 2 is a block diagram that illustrates the server of the fraud prevention system of FIG. 1, according to embodiments described herein.

FIG. 2 is a block diagram that illustrates the fraud prevention server 135 of the fraud prevention system 100 of FIG. 1. The fraud prevention server 135 is electrically and/or communicatively connected to a variety of modules or components of the system 100. For example, the illustrated fraud prevention server 135 is connected to the database 140 and the user interface 145. The fraud prevention server 135 includes a controller 200, a power supply module 205, and a network communications module 210. The controller 200 includes combinations of hardware and software that are configured to, for example, provide the OAO service to evaluate the behaviors of the users associated with the devices 105-125 while the users are opening an online account. The controller 200 includes a plurality of electrical and electronic components that provide power, operational control, and protection to the components and modules within the controller 200 and/or the system 100. For example, the controller 200 includes, among other things, an electronic processor 215 (e.g., a microprocessor, a microcontroller, or other suitable processing device), a memory 220, input units 225, and output units 230. The electronic processor 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes.

The memory 220 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. In some examples, the program storage area may store the instructions regarding the OAO service program (referred to herein as "OAO service") as described in greater detail below and a machine learning function.

The electronic processor 215 executes machine-readable instructions stored in the memory 220. For example, the electronic processor 215 may execute instructions stored in the memory 220 to perform the functionality of the OAO service and/or the machine learning function.

Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the OAO service described herein.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also configured to supply lower voltages to operate circuits and components within the controller 200 or system 100.

The user interface 145 includes a combination of digital and analog input or output devices required to achieve a desired level of control and monitoring of the system 100. For example, the user interface 145 includes a display (e.g., a primary display, a secondary display, etc.) and input devices such as a mouse, touch-screen displays, a plurality of knobs, dials, switches, buttons, or other suitable input device. The display is, for example, a liquid crystal display ("LCD"), a light-emitting diode ("LED") display, an organic LED ("OLED") display, or other suitable display.

The fraud prevention server 135 is configured to perform the OAO service to evaluate how fields have been completed, evaluating a broad set of attributes that enable the model to distinguish between benign autofill and scripted form completion. By looking at fields that are challenging to autofill (e.g., 3-part phone number fields), the fraud prevention server 135 is able to separate autofill from scripted automation by detecting the effectiveness of form-specific scripted solutions. Similarly, the fraud prevention server 135 separates good users and nefarious actors by differentiating their behavior, for example, by detecting common manual fraud approaches (e.g., copy-paste) and even assessing user familiarity with the data in highly memorable fields (e.g., a Full Name field and a Phone Number field).

The following data points are an illustrative subset of the data that may be used by the fraud prevention server 135 in performing the OAO service to detect fraudulent behavior (and consequently, application risk): 1) cadence of completing the form, 2) method of moving through the form (click or tab), 3) progression through the form, 4) field order and 'circle back' behavior, 5) cadence and speed of user typing, 6) form focus and window-switching behavior, 7) detail-checking, and pausing behavior, 7) dynamics of mouse and touch interactions, 8) device orientation and accelerometer, 9) form field autocomplete or copy-paste behavior, and 10) familiarity with the form, e.g., omission of optional fields and error incidence rate.

The OAO service executed by the fraud prevention server 135 includes an OAO model. In some embodiments, the fraud prevention server 135 uses the machine learning function to receive a dataset of fraudulent applications (e.g., hundreds or thousands of example fraudulent applications) and output an OAO model that accounts for the various fraudulent aspects of the dataset. The fraud prevention server 135 may then use the OAO model that is generated to perform advanced classifications and generate a "Fraud Risk" score against application attempts in real-time. The "Fraud Risk" score measures the probability that the current application attempt was performed by a nefarious actor using manual or automated identify fraud. This probability is calculated using real-world data, where the fraud prevention server 135 compares thousands of model variants using the dataset from tens of thousands of applications across various application forms.

As explained above, the use of feature encoding increases efficiency in the OAO model. Specifically, the OAO service includes feature encoding that translates a one-dimensional array of strings into a two-dimensional array of real numbers, which in turn improves the precision of the OAO model by up to 15% over a similar model based on unencoded categorical features.

For ease of understanding, one example of feature encoding a categorical variable in the OAO model, i.e., a country categorical variable, is described herein. However, the feature encoding may be applied to some or all of the categorical variables in the OAO model. Additionally, the greater number of categorical variables that are feature encoded represents greater precision in the OAO model, and consequently, increased efficiency in the fraud prevention server 135.

In this example, a one dimensional array of the country categorical variable to be encoded with feature encoding is ["US", "CAN", "JAP"]. Further, in this example, a one-dimensional array of existing numerical OAO features to be used for the above-noted feature encoding is ["words_per_minute", "time_on_page"], which are some of the features (statistically) driving the highest precision of the OAO model prediction.

To perform feature encoding for each of the numerical OAO features selected above, the fraud prevention server 135 performs several determinations. The fraud prevention server 135 determines the average feature value (e.g. average input words per minute) for each country categorical variable value. The fraud prevention server 135 determines the number of times each country categorical variable value (e.g. each country) was recorded in a training dataset, a retaining dataset, or other trusted data source. The fraud prevention server 135 determines the average feature value across the entire population of records (e.g., in the last n days) scored by the OAO model. The fraud prevention server 135 adjusts the average feature value that is determined based on the number of times each country categorical variable was recorded and the average feature value across the entire population of records. This adjustment better models categorical variable values which were recorded very few times.

The OAO model implemented by the fraud prevention server 135 also includes an integer parameter, min_samples_leaf. This integer parameter defines the minimum samples required to take the average feature value (e.g., the average of country categorical variable value) into account.

Additionally, the OAO model implemented by the fraud prevention server 135 also includes a second integer parameter, smoothing. This integer parameter balances the effect of categorical variable average versus the population average.

The fraud prevention server 135 calculates an updated smoothing value based on the number of observations, min_samples_leaf and smoothing as defined by Equation 1 below.

$$\text{Updated Smoothing} = 1/(1+\exp(-(\text{count of times categorical variable is recorded} - \text{min\_samples\_leaf})/\text{smoothing})) \quad (1)$$

The fraud prevent server 135 applies the updated smoothing value to adjust the country categorical variable value as defined by Equation 2 below.

$$\text{Adjusted\_categorical\_variable\_value} = \text{population\_average\_feature\_value} * (1-\text{updated smoothing}) + \text{average\_feature\_value\_for\_categorical\_variable\_value} * \text{updated smoothing} \quad (2)$$

After adjusting the country categorical variable value, the fraud prevention server 135 adds random noise to the resulting adjusted_categorical_variable_value. By performing the above operations for each categorical variable value in the one-dimensional array ["US", "CAN", "JAP"], the fraud prevention server 135 determines a one-dimensional array, for example, [0.32, 0.34, 0.10].

As explained above, each country categorical variable is encoded using multiple features, and hence the fraud prevention server 135 determines a two-dimensional array. For example, the two-dimensional array is [[0.32, 0.34, 0.10], [0.11, 0.18, 0.20]], where the number of elements in the outer array represents the number of features used to encode a categorical feature. Specifically, the fraud prevention server 135 used two features ["words_per_minute", "time_on_page"] to feature encode the country categorical variable of size 3, ["US", "CAN", "JAP"]. The resulting array determined by the fraud prevention server 135 after performing feature encoding is a two-dimensional feature encoded array/matrix with dimensions of four by two. The feature encoded matrix improves the precision of the OAO model after training the OAO model with the feature encoded matrix because the OAO model now has access to new encoded features, which will allow the underlying machine learning algorithm to produce more efficient steps towards finding the optimum. These new encoded features allow the machine learning to find the optimum more efficiently because the categorical variable may now be easily sorted with respect to its fraudulent behavior, as implicitly determined by the statistically important numeric features used to encode them. These new encoded features may also be updated periodically or in real-time (with each transaction).

The following is a sample of code, written in Python and leveraging Pandas and Numpy APIs, that explains how the fraud prevention server 135 performs feature encoding during the model training phase of the OAO model.

Figure 3:
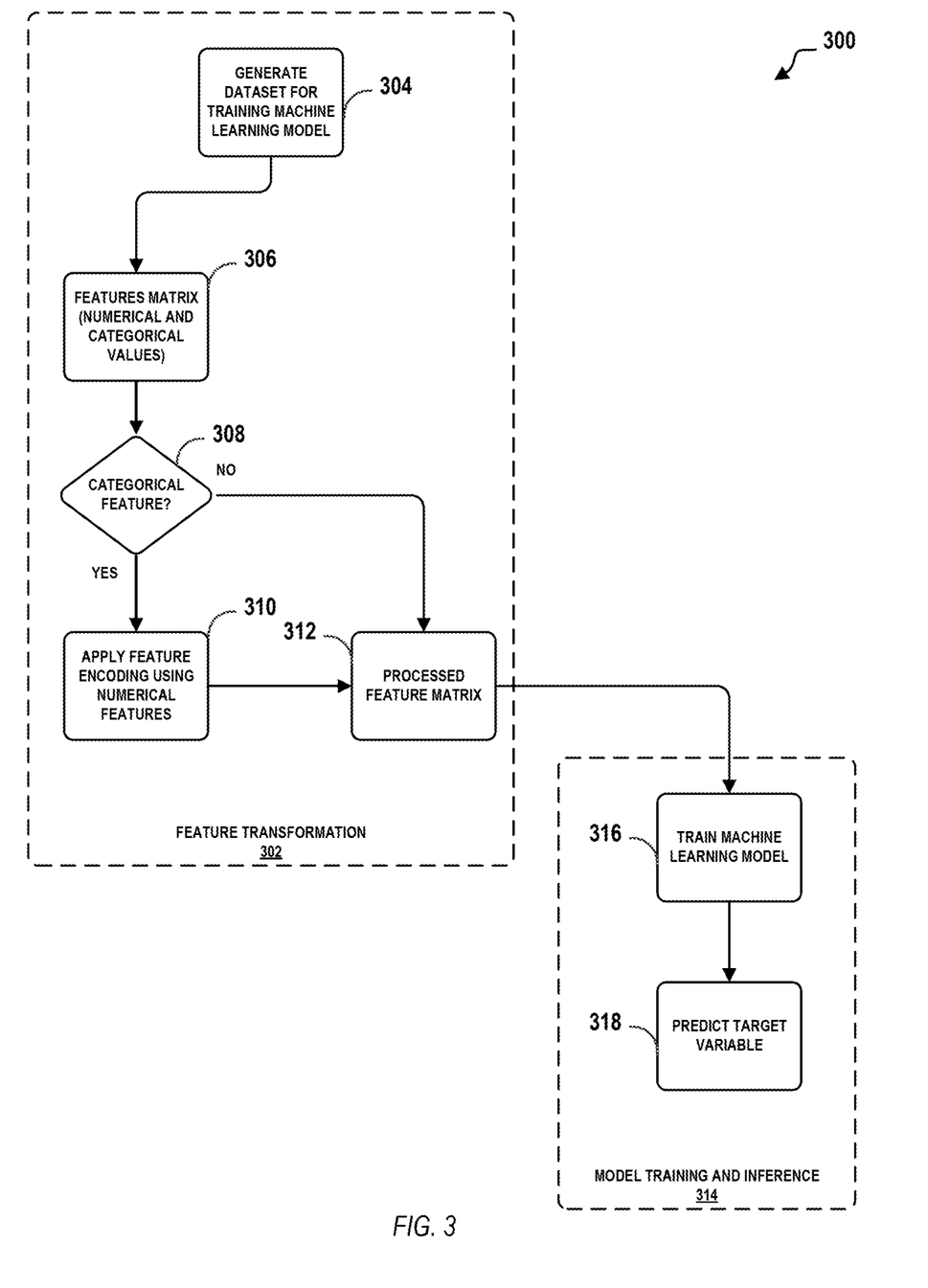
FIG. 3 is a flowchart that illustrates a method for performing feature encoding of categorical variables.

In implementing the feature transformation 302 of the method 300, the fraud prevention server 135 generates a dataset for training a machine learning model (at block 304). For example, the fraud prevention server 135 generates a dataset for training an OAO model. The method 300 also includes the fraud prevention server 135 subsetting the dataset to generate the features matrix (e.g., numerical and categorical features) (at block 306).

The method 300 includes the fraud prevention server 135 determining whether each feature in the features matrix is a categorical feature (at decision block 308). When the feature in the features matrix is not a categorical feature ("NO" at decision block 308), the fraud prevention server 135 inserts the feature into a processed feature matrix (at block 312). For example, when the feature in the features matrix is a numerical feature and not a categorical feature ("NO" at

```
import pandas as pd
import numpy as np
def add_noise(series, noise_level, noise_lvl_seed):
    """
    Adds random noise to estimated category targets to reduce overfitting
    """
    if series is not None:
        np.random.seed(noise_lvl_seed)
        return series * (1 + noise_level * np.random.randn(len(series))) else:
        return None
def target_encode_train_valid(trn_series=None,
            target=None,
            min_samples_leaf=1,
            smoothing=1,
            noise_level=0,
            noise_lvl_seed=100):
    """
    trn_series : categorical variable as pd.Series
    target : numerical feature to use for encoding as a pd.Series
    min_samples_leaf (int) : minimum samples to take category average into account
    smoothing (int) : smoothing effect to balance categorical average vs population average
    noise level : this parameter is passed to the add_noise function as it affects the variance of noise distribution
    """
    assert len(trn_series) == len(target)
    temp = pd.concat([trn_series, target], axis=1)
    # Compute the average feature value for each categorical variable value averages
    = temp.groupby(by=trn_series.name)[target.name].agg(["mean", "count"])
    # Compute an updated smoothing value
    smoothing = 1 / (1 + np.exp(-(averages["count"] - min_samples_leaf) / smoothing))
    # Calculte prior i.e. population average of an existing numerical feature prior =
target.mean( )
    # Calculate the adjusted categorical variable value
    # The bigger the count the less population average (prior) is taken into account
    averages[target.name] = prior * (1 - smoothing) + averages["mean"] * smoothing
    averages.drop(["mean", "count"], axis=1, inplace=True)
    # Apply averages to trn series
    ft_trn_series = pd.merge(
        trn_series.to_frame(trn_series.name),
        averages.reset_index( ).rename(columns={'index': target.name,
    target.name: 'average'}),
        on=trn_series.name,
        how='left')['average'].rename(trn_series.name + '_avg_' +
    target.name).fillna(prior)
    ft_trn_series.index = trn_series.index
    return add_noise(ft_trn_series, noise_level, noise_lvl_seed),
averages.reset_index( ).rename(columns= {'index': target.name, target.name: 'average'})
```

FIG. 3 is a flowchart that illustrates a method 300 for performing feature encoding of categorical variables (also referred to as "categorical features"). The method 300 includes two components: 1) Feature Transformation 302 and 2) Model Training and Inference 314 and is described with respect to the fraud prevention server 135 of FIGS. 1 and 2.

decision block 308), the fraud prevention server 135 inserts the numerical feature into a processed feature matrix (at block 312).

When the feature in the features matrix is a categorical feature ("YES" at decision block 308), the fraud prevention server 135 applies feature encoding using numerical features (at block 310). After apply featuring encoding on the categorical feature using numerical features (at block 310), the fraud prevention server 135 inserts the feature encoded categorical feature into the processed feature matrix (at block 312).

After implementing the feature transformation 302 of the method 300, the fraud prevention server 135 implements model training and inference 314 by training the machine learning model based on the processed feature matrix (at block 316) and predicting a target variable based on the newly trained machine learning model (at block 318).

Figure 4:
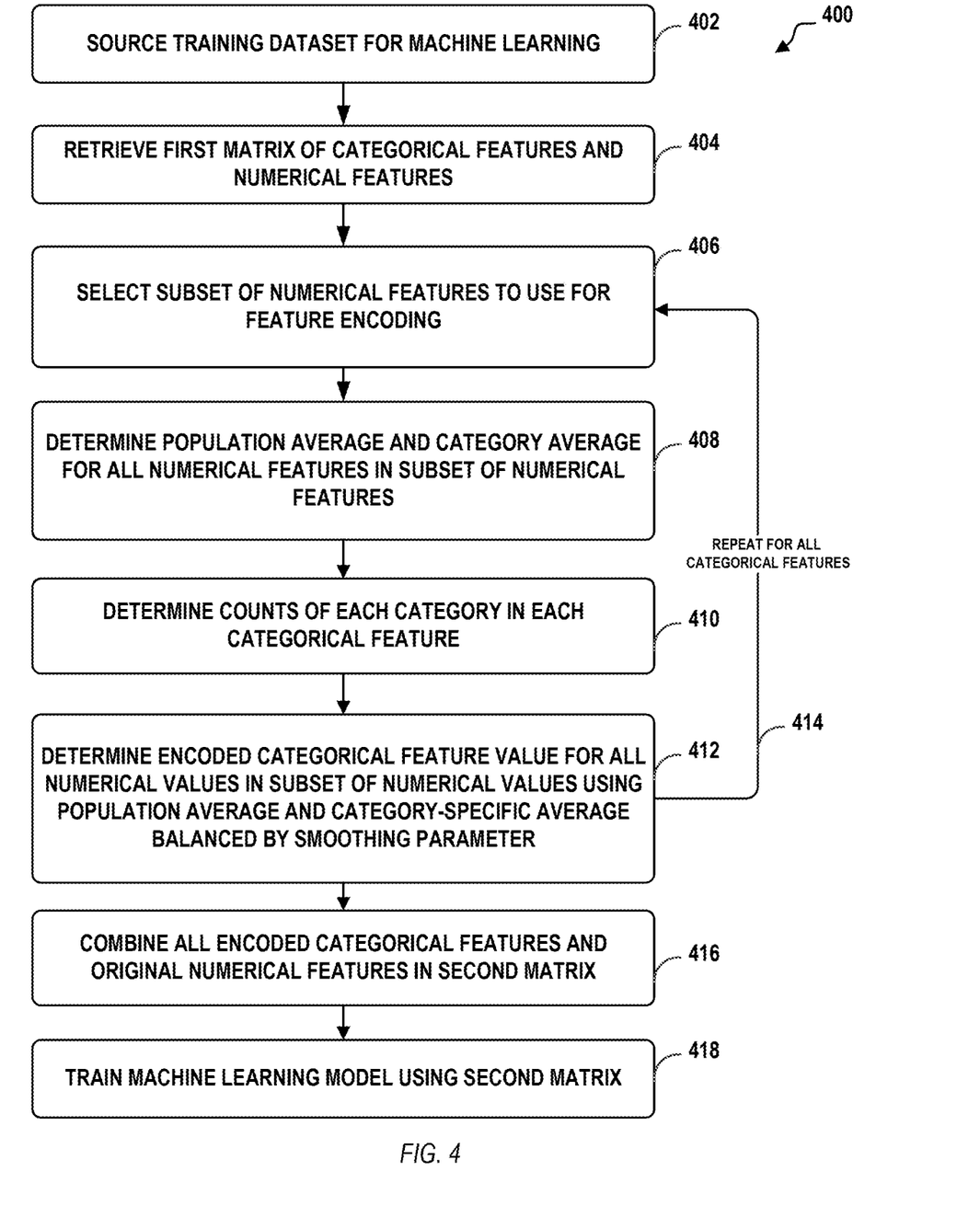
FIG. 4 is a flowchart that illustrates an alternative method for performing feature encoding of categorical variables.

FIG. 4 is a flowchart that illustrates an alternative method 400 for performing feature encoding of categorical variables (also referred to as "categorical features"). FIG. 4 is described with respect to the fraud prevention server 135 of FIGS. 1 and 2.

The method 400 includes the fraud prevention server 135 sourcing a training dataset for machine learning (at block 402). The method 400 includes the fraud prevention server 135 retrieving a first matrix of categorical features and numerical features (at block 404). The method 400 includes the fraud prevention server 135 selecting a statistically important subset of numerical features to use for feature encoding (at block 406).

The method 400 includes the fraud prevention server 135 determining a population average and a category average for all numerical features in the statistically important subset of numerical features (at block 408). The method 400 includes the fraud prevention server 135 determining counts of each category in each categorical feature (at block 410). The method 400 includes the fraud prevention server 135 determining an encoded categorical feature value for all numerical values in statistically important subset of numerical values using population average and category-specific average balanced by smoothing parameter (at block 412). The fraud prevention server 135 repeats blocks 406-412 for all categorical features in the first matrix (at arrow 414).

After determining encoded categorical feature values for all categorical features in the first matrix, the fraud prevention server 135 combines all of the encoded categorical feature values with the original numerical features in a second matrix (at block 416). The fraud prevention server 135 trains the machine learning model (e.g., the OAO model) with the second matrix to improve the precision of the machine learning model (at block 418).

Figure 5:
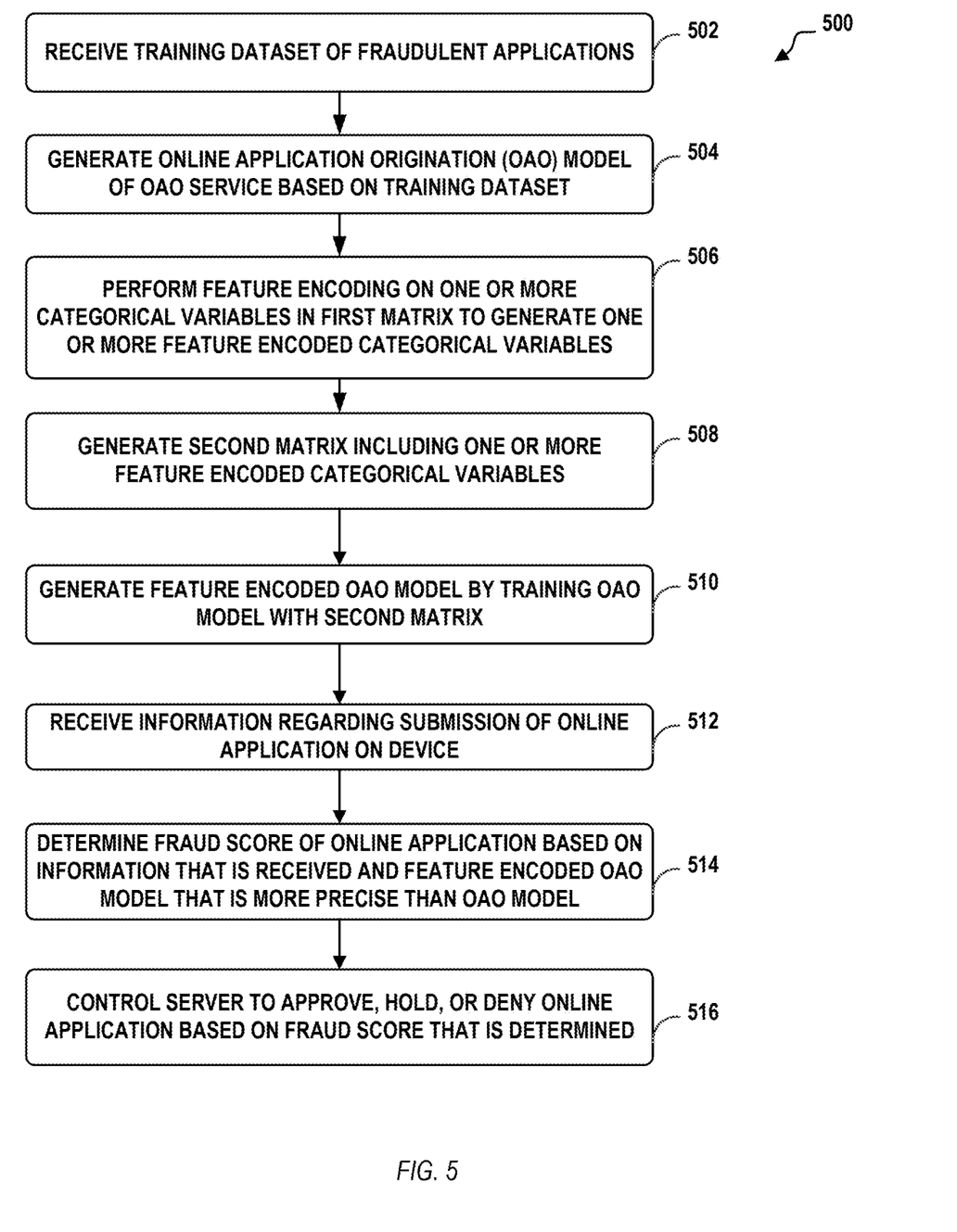
FIG. 5 is a flowchart that illustrates a method for operating a fraud prevention system.

FIG. 5 is a flowchart that illustrates a method 500 for operating a fraud prevention system. FIG. 5 is described with respect to the fraud prevention server 135 of FIGS. 1 and 2.

The method 500 includes receiving, with an electronic processor, a training dataset of fraudulent applications (at block 502). For example, the electronic processor 215 of the fraud prevention server 135 receives a training dataset of fraudulent applications.

The method 500 includes generating, with the electronic processor and machine learning, an online application origination (OAO) model of the OAO service based on the training dataset, the OAO model differentiating between a behavior of a normal user and a fraudulent behavior of a nefarious actor during a submission of an online application on a device (at block 504). For example, the electronic processor 215 generates an OAO model of the OAO service based on the training dataset, the OAO model differentiating between a behavior of a normal user and a fraudulent behavior of a nefarious actor during a submission of an online application on one of the user devices 105-125.

The method 500 includes performing, with the electronic processor, feature encoding on one or more categorical variables in a first matrix to generate one or more feature encoded categorical variables, the first matrix including the one or more categorical variables and numerical features, and the one or more feature encoded categorical variables are feature encoded with one or more numerical values of the numerical features (at block 506). For example, the electronic processor 215 performs feature encoding on one or more categorical variables (e.g., a country categorical variable) in a first matrix (e.g., ["US", "CAN", JAP", "US"]) to generate one or more feature encoded categorical variables (e.g., [[0.32, 0.34, 0.10, 0.32], [0.11, 0.18, 0.20, 0.11]]), the first matrix including the one or more categorical variables and numerical features (e.g., ["words_per_ minute", "time_on_page"]), and the one or more feature encoded categorical variables are feature encoded with one or more numerical values of the numerical features (e.g., numerical values for ["words_per_minute", "time_on_page"]).

The method 500 includes generating, with the electronic processor, a second matrix including the one or more feature encoded categorical variables (at block 508). For example, the electronic processor 215 generates a second matrix including the one or more feature encoded categorical variables (e.g., [[0.32, 0.34, 0.10, 0.32], [0.11, 0.18, 0.20, 0.11]]). In some examples, the second matrix includes the one or more numerical values in addition the one or more feature encoded categorical variables. In other examples, the second matrix may only the one or more feature encoded categorical variables.

The method 500 includes generating, with the electronic processor, a feature encoded OAO model by training the OAO model with the second matrix (at block 510). For example, the electronic processor 215 generates a feature encoded OAO by training the OAO model with the second matrix.

The method 500 includes receiving, with the electronic processor, information regarding the submission of the online application on the device (at block 512). For example, the electronic processor 215 receives information regarding the submission of the online application on one of the user device 105-125 from the client server 150.

The method 500 includes determining, with the electronic processor, a fraud score of the online application based on the information that is received and the feature encoded OAO model, the feature encoded OAO model being more precise than the OAO model (at block 514). For example, the electronic processor 215 determines a fraud score of the online application based on the information that is received and the feature encoded OAO model that is more precise in indicating fraudulent activity by a nefarious actor than a fraud score based on the OAO model.

The method 500 also includes controlling, with the electronic processor, a server to approve, hold, or deny the online application based on the fraud score that is determined (at block 516). For example, the electronic processor 215 controls the network communications 210 to output a control message to the client server 150, the control message controlling the client server 150 to approve, hold, or deny the online application based on the fraud score that is determined.

In some examples, performing the feature encoding on the one or more categorical variables in the first matrix to generate the one or more feature encoded categorical variables may further include determining an average feature value of one of the numerical features in the training dataset for one of the one or more categorical variables, determining a number of times the one of the one or more categorical variables was recorded in the training dataset, determining a population average feature value of the one of the numerical features across a specific time period in the training dataset, and adjusting the average feature value based on the number of times the one of the one or more categorical variables was recorded in the training dataset and the population average feature value.

In these examples, performing the feature encoding on the one or more categorical variables in the first matrix to generate the one or more feature encoded categorical variables may further include determining a smoothing value based on a first integer parameter and a second integer parameter. The first integer parameter defines a minimum number of samples required to determine the average feature value. The second integer parameter balances an effect of the average feature value and the population average feature value.

In these examples, performing the feature encoding on the one or more categorical variables in the first matrix to generate the one or more feature encoded categorical variables may further include determining an encoded categorical variable value that is equal to the population average feature value multiplied by one minus the smoothing value and an addition of the average feature value multiplied by the smoothing value.

In these examples, performing the feature encoding on the one or more categorical variables in the first matrix to generate the one or more feature encoded categorical variables may further include adding random noise to the encoded categorical variable value.

In these examples, generating the second matrix including the one or more feature encoded categorical variables may further include generating the second matrix by determining the encoded categorical variable value for each categorical variable.

In some examples, the first matrix may be a one-dimensional array, and the second matrix may be a two-dimensional array. Additionally, in some examples, the one or more categorical variables may include a country categorical variable, and the numerical features may include a words-per-minute numerical feature and a time-on-page numerical feature.

Thus, embodiments described herein provide, among other things, feature encoding in an online application origination (OAO) service for a fraud prevention system. Various features and advantages are set forth in the following claims.

What is claimed is:

1. A fraud prevention system comprising:
a third-party client server hosting an online application; and
a fraud prevention server including an electronic processor and a memory, the memory including an online application origination (OAO) service,
wherein, when executing the OAO service, the electronic processor is configured to
receive a training dataset of fraudulent online applications using only electronic devices,
generate, with machine learning, an online application origination (OAO) model of the OAO service based on the training dataset, the OAO model differentiating between behaviors of a normal user and fraudulent behaviors of a nefarious actor that occur during a submission of the online application using a first electronic device, the submission capturing a single session of the online application,
perform feature encoding on one or more categorical variables in a first matrix to generate one or more feature encoded categorical variables, the first matrix including the one or more categorical variables and numerical features, and the one or more feature encoded categorical variables are feature encoded with one or more numerical values of the numerical features,
generate a second matrix including the one or more feature encoded categorical variables,
generate, with the machine learning, a feature encoded OAO model by training the OAO model with the second matrix,
receive behavioral information associated with a second submission of the online application using a second electronic device, the second submission capturing a second single session of the online application, and the behavioral information being captured in parallel to the second submission,
determine a fraud score of the second submission of the online application based on the behavioral information that is received and the feature encoded OAO model, and
control the third-party client server to approve, hold, or deny the second submission of the online application based on the fraud score that is determined, wherein the third-party client server is owned by a first entity, and wherein the fraud prevention server is owned by a second entity that has no association with the first entity, and
wherein the behavioral information includes information from one or more of a group consisting of:
cadence of completing the form,
method of moving through the form,
progression through the form,
field order behavior,
"circle back" behavior,
cadence of user typing,
speed of user typing,
form focus behavior,
window-switching behavior,
detail-checking behavior,
pausing behavior,
dynamics of mouse interaction,
dynamics of touch interactions,
device orientation,
device accelerometer,
form field autocomplete,
copy-paste behavior, and
familiarity with the form.

2. The fraud prevention system of claim 1, wherein, to perform the feature encoding on the one or more categorical variables in the first matrix to generate the one or more feature encoded categorical variables, the electronic processor is further configured to
determine an average feature value of one of the numerical features in the training dataset for one of the one or more categorical variables,
determine a number of times the one of the one or more categorical variables was recorded in the training dataset,
determine a population average feature value of the one of the numerical features across a specific time period in the training dataset, and
adjust the average feature value based on the number of times the one of the one or more categorical variables was recorded in the training dataset and the population average feature value.

3. The fraud prevention system of claim 2, wherein, to perform the feature encoding on the one or more categorical variables in the first matrix to generate the one or more feature encoded categorical variables, the electronic processor is further configured to determine a smoothing value based on a first integer parameter and a second integer parameter,
- wherein the first integer parameter defines a minimum number of samples required to determine the average feature value, and
- wherein the second integer parameter balances an effect of the average feature value and the population average feature value.

4. The fraud prevention system of claim 3, wherein, to perform the feature encoding on the one or more categorical variables in the first matrix to generate the one or more feature encoded categorical variables, the electronic processor is further configured to determine an encoded categorical variable value that is equal to the population average feature value multiplied by one minus the smoothing value and an addition of the average feature value multiplied by the smoothing value.

5. The fraud prevention system of claim 4, wherein, to perform the feature encoding on the one or more categorical variables in the first matrix to generate the one or more feature encoded categorical variables, the electronic processor is further configured to add random noise to the encoded categorical variable value.

6. The fraud prevention system of claim 5, wherein, to generate the second matrix including the one or more feature encoded categorical variables, the electronic processor is further configured to generate the second matrix by determining the encoded categorical variable value for each categorical variable.

7. The fraud prevention system of claim 5, wherein the first matrix is a one-dimensional array, and wherein the second matrix is a two-dimensional array.

8. The fraud prevention system of claim 1, wherein the one or more categorical variables include a country categorical variable, and wherein the numerical features include a words-per-minute numerical feature and a time-on-page numerical feature.

9. A method for operating a fraud prevention system, the method comprising:
- receiving, with an electronic processor of a fraud prevention server, a training dataset of fraudulent online applications using only electronic devices; generating, with the electronic processor and machine learning, an online application origination (OAO) model of the OAO service based on the training dataset, the OAO model differentiating between behaviors of a normal user and fraudulent behaviors of a nefarious actor that occur during a submission of an online application hosted by a third-party client server using a first electronic device, the submission capturing a single session of the online application; performing, with the electronic processor, feature encoding on one or more categorical variables in a first matrix to generate one or more feature encoded categorical variables, the first matrix including the one or more categorical variables and numerical features, and the one or more feature encoded categorical variables are feature encoded with one or more numerical values of the numerical features;
- generating, with the electronic processor, a second matrix including the one or more feature encoded categorical variables; and
- generating, with the electronic processor and the machine learning, a feature encoded OAO model by training the OAO model with the second matrix;
- receiving, with the electronic processor, behavioral information associated with a second submission of the online application hosted by the third-party client server using a second electronic device, the second submission capturing a second single session of the online application, and the behavioral information being captured in parallel to the second submission;
- determining, with the electronic processor, a fraud score of the second submission of the online application based on the behavioral information that is received and the feature encoded OAO model; and
- controlling, with the electronic processor, the third-party client server to approve, hold, or deny the second submission of the online application based on the fraud score that is determined,
- wherein the third-party client server is owned by a first entity, and
- wherein the fraud prevention server is owned by a second entity that has no association with the first entity, and
- wherein the behavioral information includes information from one or more of a group consisting of:
  - cadence of completing the form,
  - method of moving through the form,
  - progression through the form,
  - field order behavior,
  - "circle back" behavior,
  - cadence of user typing,
  - speed of user typing,
  - form focus behavior,
  - window-switching behavior,
  - detail-checking behavior,
  - pausing behavior,
  - dynamics of mouse interaction,
  - dynamics of touch interactions,
  - device orientation,
  - device accelerometer,
  - form field autocomplete,
  - copy-paste behavior, and
  - familiarity with the form.

10. The method of claim 9, wherein performing the feature encoding on the one or more categorical variables in the first matrix to generate the one or more feature encoded categorical variables further includes
- determining an average feature value of one of the numerical features in the training dataset for one of the one or more categorical variables,
- determining a number of times the one of the one or more categorical variables was recorded in the training dataset,
- determining a population average feature value of the one of the numerical features across a specific time period in the training dataset, and
- adjusting the average feature value based on the number of times the one of the one or more categorical variables was recorded in the training dataset and the population average feature value.

11. The method of claim 10, wherein performing the feature encoding on the one or more categorical variables in the first matrix to generate the one or more feature encoded categorical variables further includes determining a smoothing value based on a first integer parameter and a second integer parameter, wherein the first integer parameter defines a minimum number of samples required to determine the average feature value, and wherein the second integer parameter balances an effect of the average feature value and the population average feature value.

12. The method of claim 11, wherein performing the feature encoding on the one or more categorical variables in the first matrix to generate the one or more feature encoded categorical variables further includes determining an encoded categorical variable value that is equal to the population average feature value multiplied by one minus the smoothing value and an addition of the average feature value multiplied by the smoothing value.

13. The method of claim 12, wherein performing the feature encoding on the one or more categorical variables in the first matrix to generate the one or more feature encoded categorical variables further includes adding random noise to the encoded categorical variable value.

14. The method of claim 13, wherein generating the second matrix including the one or more feature encoded categorical variables further includes generating the second matrix by determining the encoded categorical variable value for each categorical variable.

15. The method of claim 14, wherein the first matrix is a one-dimensional array, and wherein the second matrix is a two-dimensional array.

16. The method of claim 9, wherein the one or more categorical variables include a country categorical variable, and wherein the numerical features include a words-per-minute numerical feature and a time-on-page numerical feature.

17. A non-transitory computer-readable medium comprising instructions that, when executed by an electronic processor of a fraud prevention server, causes the electronic processor to perform a set of operations comprising:
receiving a training dataset of fraudulent online applications using only electronic devices;
generating, with machine learning, an online application origination (OAO) model of the OAO service based on the training dataset, the OAO model differentiating between behaviors of a normal user and fraudulent of a nefarious actor, that occur during a submission of an online application hosted by a third-party client server, using a first electronic device, the submission capturing a single session of the online application;
performing feature encoding on one or more categorical variables in a first matrix to generate one or more feature encoded categorical variables, the first matrix including the one or more categorical variables and numerical features, and the one or more feature encoded categorical variables are feature encoded with one or more numerical values of the numerical features;
generating a second matrix including the one or more feature encoded categorical variables;
generating, with the machine learning, a feature encoded OAO model by training the OAO model with the second matrix;
receiving behavioral information associated with a second submission of the online application hosted by the third-party client server using a second electronic device, the second submission capturing a second single session of the online application, and the behavioral information being captured in parallel to the second submission; determining a fraud score of the second submission of the online application based on the behavioral information that is received and the feature encoded OAO model; and
controlling the third-party client server to approve, hold, or deny the second submission of the online application based on the fraud score that is determined, wherein the third-party client server is owned by a first entity, and wherein the fraud prevention server is owned by a second entity that has no association with the first entity, and
wherein the behavioral information includes information from one or more of a group consisting of:
cadence of completing the form,
method of moving through the form,
progression through the form,
field order behavior,
"circle back" behavior,
cadence of user typing,
speed of user typing,
form focus behavior,
window-switching behavior,
detail-checking behavior,
pausing behavior,
dynamics of mouse interaction,
dynamics of touch interactions,
device orientation,
device accelerometer,
form field autocomplete,
copy-paste behavior, and
familiarity with the form.

18. The non-transitory computer-readable medium of claim 17, performing the feature encoding on the one or more categorical variables in the first matrix to generate the one or more feature encoded categorical variables further includes
determining an average feature value of one of the numerical features in the training dataset for one of the one or more categorical variables,
determining a number of times the one of the one or more categorical variables was recorded in the training dataset,
determining a population average feature value of the one of the numerical features across a specific time period in the training dataset, and
adjusting the average feature value based on the number of times the one of the one or more categorical variables was recorded in the training dataset and the population average feature value.

19. The non-transitory computer-readable medium of claim 18, wherein performing the feature encoding on the one or more categorical variables in the first matrix to generate the one or more feature encoded categorical variables further includes
determining a smoothing value based on a first integer parameter and a second integer parameter,
wherein the first integer parameter defines a minimum number of samples required to determine the average feature value, and
wherein the second integer parameter balances an effect of the average feature value and the population average feature value.

20. The non-transitory computer-readable medium of claim 19, wherein performing the feature encoding on the one or more categorical variables in the first matrix to generate the one or more feature encoded categorical variables further includes
determining an encoded categorical variable value that is equal to the population average feature value multiplied by one minus the smoothing value and an addition of the average feature value multiplied by the smoothing value.

21. The fraud prevention system of claim 1, wherein, to perform the feature encoding on the one or more categorical variables in the first matrix to generate the one or more feature encoded categorical variables, the electronic processor is further configured to translate a one-dimensional array of strings of the first matrix into a two-dimensional array of real numbers of the second matrix,
- wherein the feature encoded OAO model is more precise than the OAO model by up to 15% after translating the one-dimensional array of strings of the first matrix into the two-dimensional array of real numbers of the second matrix, and wherein the feature encoded OAO model is more precise than the OAO model because the machine learning, with the second matrix, trains more efficient steps into the feature encoded OAO model towards finding an optimum of the fraud score relative to steps included in the OAO model.

\* \* \* \* \*